United States Patent [19]

Huff

[11] 4,240,458
[45] Dec. 23, 1980

[54] EXCESS PRESSURE SHUTOFF VALVE

[75] Inventor: Norman M. Huff, Chicago, Ill.

[73] Assignee: Harper-Wyman Company, Hinsdale, Ill.

[21] Appl. No.: 900,237

[22] Filed: Apr. 26, 1978

Related U.S. Application Data

[63] Continuation of Ser. No. 791,179, Apr. 27, 1977, abandoned.

[51] Int. Cl.³ .................................................. F16K 43/00
[52] U.S. Cl. .................................. 137/315; 137/327; 137/461
[58] Field of Search ............... 137/315, 327, 461, 463, 137/460, 505.42; 251/75

[56] References Cited

U.S. PATENT DOCUMENTS

| | | | |
|---|---|---|---|
| 2,070,661 | 2/1937 | Hughes | 251/75 X |
| 2,712,427 | 7/1955 | Welborn | 137/461 X |
| 2,785,698 | 3/1957 | Vance | 137/461 X |
| 3,731,707 | 5/1973 | Berle | 251/75 X |
| 3,892,258 | 7/1975 | Hendrick | 137/461 X |
| 3,920,033 | 11/1975 | Ferrando | 137/505.42 |
| 4,026,314 | 5/1977 | Turner | 251/75 X |

FOREIGN PATENT DOCUMENTS 1016694  1/1966  United Kingdom ..................... 251/75

Primary Examiner—Harold W. Weakley
Attorney, Agent, or Firm—Mason, Kolehmainen, Rathburn & Wyss

[57] ABSTRACT

A valve adapted to be connected in a fluid line for shutting off flow in response to fluid pressure in excess of a predetermined pressure. The valve includes a housing provided with inlet and outlet ports separated by a valve seat. A pressure chamber in the housing is defined by a diaphragm subjected to the pressure of fluid flowing through the housing. The diaphragm is a unitary, homogenous, fluid impervious snap disc movable between two over center stable positions. A valve member cooperating with the valve seat is connected to the diaphragm by a stem, and the valve is open in one diaphragm position and closed in the other diaphragm position. A spring biases the valve member toward the closed position and is adjusted to preload the diaphragm so that when fluid pressure exceeds a predetermined value the diaphragm moves from the valve open to the valve closed position. A reset member is carried by the diaphragm and permits manual reopening of the valve.

20 Claims, 4 Drawing Figures

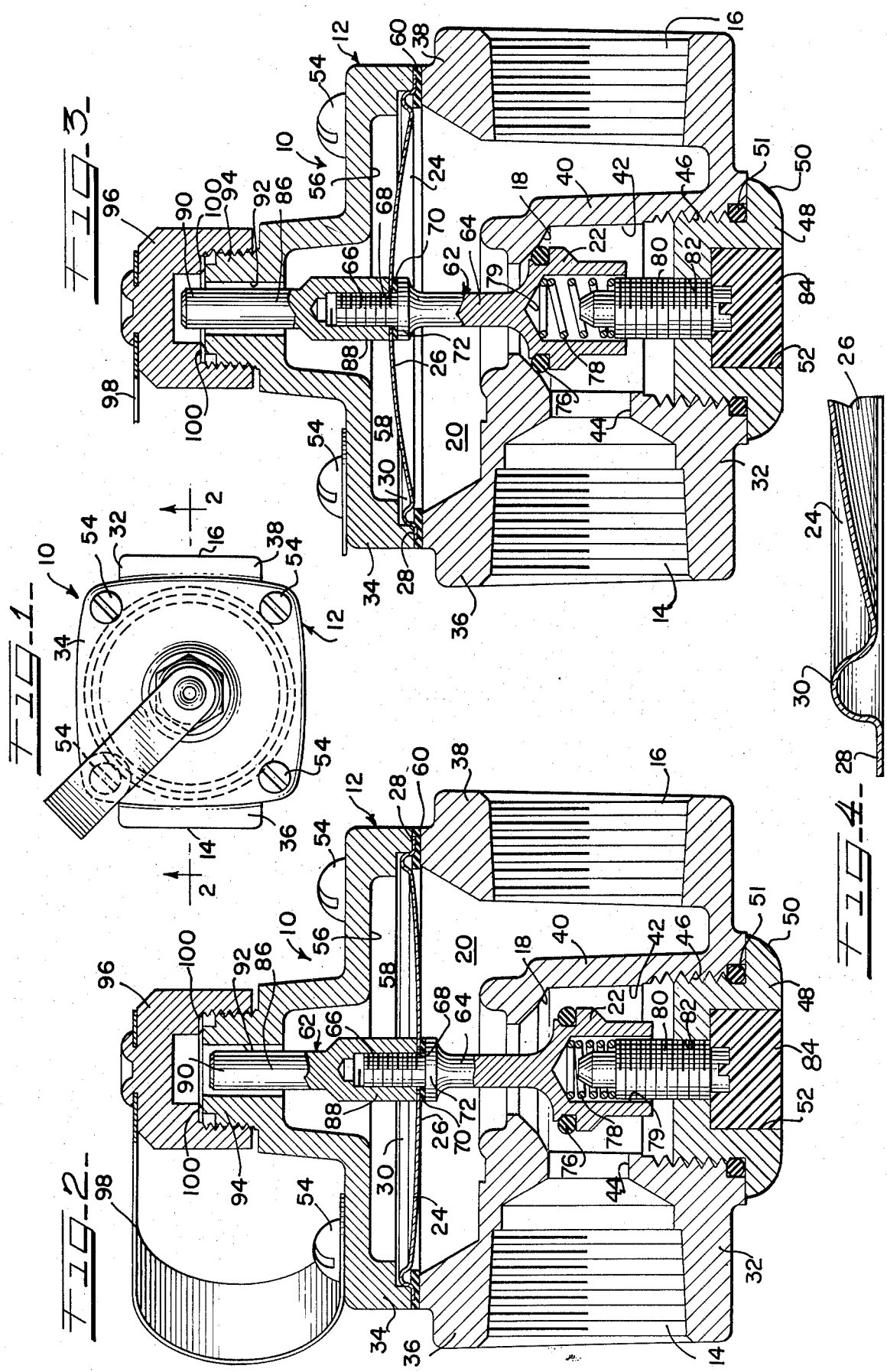

EXCESS PRESSURE SHUTOFF VALVE

The present application is a continuation application of patent application Ser. No. 791,179, filed Apr. 27, 1977, and now abandoned.

The present invention relates to an improved excess pressure shutoff valve for discontinuing flow through the valve in response to fluid pressure in excess of a predetermined value.

Gas fueled appliances are designed to operate safely at or below established gas pressure levels. Should gas pressures exceed the established levels, an unsafe condition can arise. Although this problem can exist in several types of systems, one specific example is an LP gas system of a recreational vehicle or the like wherein LP gas is supplied from a tank at a predetermined safe pressure under the control of a tank regulator valve. If the regulator valve fails to operate properly, for example because of blockage of its breather vent, LP gas can be supplied to the recreational vehicle gas system at excessive and dangerous pressures.

In order to prevent this hazardous condition, the system may be provided with an excess pressure shutoff valve. Such a valve responds to excessive pressure by closing the gas supply to the system until such time as the cause of the excessive pressure is corrected and the shutoff valve is manually reset to its open condition. Because such valves are intended alternatively to permit unobstructed flow or to discontinue all flow, they normally are movable abruptly between fully open and closed positions.

Excess pressure shutoff valves have been developed in the past. Typically a valve of this character includes a diaphragm subject to fluid pressure controlling a trigger mechanism of some sort, the trigger mechanism in turn controlling the closing of a valve. Consequently, known devices include a multiplicity of parts, are complex and expensive, and are not highly reliable. One example of an excess pressure shutoff valve developed in the past may be found in U.S. Pat. No. 3,892,258 disclosing a spring loaded diaphragm assembly exposed to pressure of fluid flowing through the valve, a spring loaded valve assembly controlling flow through the valve, and a snap acting operator interposed between the diaphragm assembly and the valve assembly for providing bistable valve operation.

Among the important objects of the present invention are to provide an excess pressure shutoff valve utilizing a minimum number of simple parts yet capable of reliable, trouble-free operation; to provide a valve wherein over-center, bistable operation is achieved without the use of a separate trigger mechanism or snap acting operator; to provide a valve capable of being easily and reliably adjusted and reset; to provide a valve which cannot be misadjusted by the user; and to provide an excess pressure shutoff valve overcoming the disadvantages of devices used in the past.

In brief, in accordance with the above and other objects of the present invention, there is provided an excess pressure shutoff valve including a housing having inlet and outlet ports, a valve seat in the housing between the ports, and a pressure chamber in the flow path. A diaphragm exposed to pressure within the chamber is interconnected by a stem with a valve member cooperating with the valve seat to open and close the flow path. In accordance with an important feature of the invention, the diaphragm consists of a unitary and homogenous fluid impervious bistable snap disc so that bistable operation of the valve between its open and its closed position is achieved without any separate trigger mechanism or snap acting operator.

Another important feature of the invention resides in the easy adjustability and simple construction of the excess pressure shutoff valve. A single spring is held in compression between the valve member and an adjustable element and biases the valve member toward its closed position. The biasing force is adjusted so that the valve closes at a predetermined pressure. The valve member, the stem, and a manual reset member form a single plunger assembly carried by the diaphragm so that closing of the valve and resetting of the valve to its open position are accomplished in a simple manner. The adjusting member is countersunk in a recess receiving a drive member for assembling the valve, and the recess is filled with a potting material so that disassembly and misadjustment of the valve by the user is inhibited.

The invention together with the above and other objects and advantages may best be understood from the following detailed description of the embodiment of the invention shown in the accompanying drawings, wherein:

FIG. 1 is a top plan view of an excess pressure shutoff valve constructed in accordance with the present invention;

FIG. 2 is a sectional view on an enlarged scale of the valve taken along the line 2—2 of FIG. 1 and showing the valve in the open position;

FIG. 3 is a view similar to FIG. 2 and illustrating the valve in the closed position; and FIG. 4 is a fragmentary sectional view on an enlarged scale illustrating a portion of the valve diaphragm.

Proceeding now to the drawings, there is illustrated an excess pressure shutoff valve constructed in accordance with the principles of the present invention and designated as a whole by the reference numeral 10. The valve includes a housing generally designated as 12 including an inlet port 14 and outlet port 16 separated by a valve seat 18 and an internal pressure chamber 20. A valve member 22 cooperates with the seat 18 to prevent or permit flow between the inlet 14 and the outlet 16. Movement of the valve member 22 is controlled by means of a diaphragm 24 exposed to fluid pressure within the pressure chamber 20.

In accordance with an important feature of the present invention, the diaphragm 24 not only performs the conventional functions of sealing the pressure chamber 20 and moving in response to pressure changes within the chamber 20, but also produces abrupt or snap-acting movement of the valve member 22 from the open to the closed position without the necessity for separate trigger mechanisms or snap-acting operators. This is accomplished by forming the diaphragm 24 as a snap disc.

More specifically, the diaphragm 24 consists of a unitary, homogenous, fluid impervious sheet of material which is relatively rigid, rather than soft, yet which is capable of flexing. One example of a suitable material is a sheet metal such as stainless steel designated as a ½ hard 302 stainless steel and having a thickness in the neighborhood of 0.005 inch.

In order to provide the diaphragm 24 with a bistable, snap-acting operation, its central region, designated in the drawings as 26, is formed into a dished or concavo-convex shape, the initially formed shape of the diaphragm 24 being that of the valve closed position illustrated in FIG. 3. The diaphragm includes a circular, planar outer lip 28, and the lip 28 is isolated from the dished portion 26 by means of a continuous annular rib 30. A stress relief operation may in some cases improve performance of diaphragm 24. For example, a stainless steel sheet material as described above may be heat treated in the temperature range of 450° to 750°.

Because of the provision of the dished portion 26, the diaphragm 24 acts as a self-biased, over-center toggle mechanism having two stable positions—one wherein the dished portion 26 is dished upwardly as seen in FIG. 3 and the other being when the dished portion 26 is dished downwardly as seen in FIG. 2. In either of these two positions, the diaphragm 24 is stable. When urged toward the other position with sufficient force, the dished portion 26 abruptly snaps from its initial stable position to its alternate stable position.

Proceeding now to a more detailed description of the construction and operation of the excess pressure shutoff valve 10, the housing 12 includes a body 32 and a cover 34. Diametrically opposed bosses 36 and 38 on the body accommodate respectively the inlet and outlet ports 14 and 16. A partition 40 formed internally of the body surrounds an interior region 42 at the inlet side of the valve seat 18 with which the inlet port 14 communicates by means of a passage 44.

An access opening 46 permits the valve member 22 to be inserted into the housing 12, after which the access opening 46 is closed by a threaded plug 48. The plug 48 includes a lip 50 capturing a seal 51, and the lip is smooth and circular so that the plug 48 cannot readily be removed by grasping the lip with a tool. The plug is threaded into the body by insertion of a tool into a recess 52 formed in the plug. For example, the recess 52 can be formed as a circular cylinder, and a broach can be used to rotate the plug. Alternatively, the recess could be hex-shaped for engagement by a hex key. It is intended that after assembly of the plug 48 in body 32, disassembly can only be accomplished by insertion of a tool into recess 52.

Cover 34 is attached to the body 32 by a number of fasteners 54. A cavity 56 defined between the cover 34 and body 32 is subdivided by diaphragm 24 into the pressure chamber 20 and a vent chamber 58. The lip 28 of the diaphragm 24 is clamped against a gasket 60 between the body 32 and cover 34 at the periphery of cavity 56.

When the valve member 22 is in the open position illustrated in FIG. 2, fluid flows from the inlet port 14, through passage 44 and region 42, through the valve seat 18 and into the pressure chamber 20. From the pressure chamber 20 fluid flows from the housing 12 through the outlet port 16. Fluid within the pressure chamber 20 applies to diaphragm 24 a pressure urging the diaphragm in the upward direction as viewed in FIGS. 2 and 3. When the valve member 22 moves to the closed position illustrated in FIG. 3, flow through the valve seat 18 is prevented and the flow path is blocked.

A plunger assembly generally designated as 62 including the valve member 22 is attached to diaphragm 24 for movement therewith. More specifically, the plunger assembly includes a valve stem 64 having a reduced diameter, threaded stub portion 66 extending through an opening 68 formed in the center of the diaphragm. The opening 68 is sealed by a seal 70 carried by a flange 72 at the base of the stub portion 66.

Stem 64 extends from the flange portion 72 to the valve member 22 and interconnects the valve member with the diaphragm 24 for simultaneous movement. The valve member 22 supports an O-ring 76 for sealing against the valve seat 18 in the valve closed position.

It is desirable that the excess pressure shutoff valve 10 operate reliably to close at an accurately determined preset pressure regardless of tolerance variations and the like in manufacture of the elements of the valve. It is also desirable that the valve be capable of operating at different preset pressure levels. For this reason the diaphragm 24 is designed so that the force necessary to move the diaphragm from the valve open position to the valve closed position is greater than the force resulting from excessive pressurization of the chamber 20. The diaphragm 24 is then preloaded or partially biased toward the valve closed position by means of a spring 78, and the spring biasing force is accurately adjusted so that predetermined pressure conditions within the chamber 20 will result in closing of the valve.

More specifically, the valve member 22 is provided with a recess 79 within which is telescoped the end of a calibration screw or adjustment member 80. Spring 78 is held in compression between the calibration screw 80 and the base of recess 79, and the degree of compression of the spring in the valve open position is adjusted by threading the calibration screw 80 in and out in a threaded, reduced diameter portion 82 of the recess 52 in the plug 48.

More specifically, the shutoff pressure of the valve 10 is intended to be preset prior to use. This is accomplished by pressurizing the chamber 20 at the desired shutoff pressure while the valve is in its open condition. The calibration screw 80 is then threaded inwardly in order to compress the spring 78. When the spring biasing force increases to the point where it acts in concert with the pressure loading of the diaphragm 24 to cause the diaphragm to snap to the valve closed position, the calibration screw is properly adjusted.

It is desirable that a user of the valve be prevented from disassembling and/or readjusting the valve 10. The head of the calibration screw 80 is countersunk in the opening 52 in plug 48. Consequently, the application of a suitable potting material 84 in the opening 50 covers the calibration screw 80 to hold it in place and to prevent later misadjustment of the valve. In addition, the potting material 84 fills the opening 50 so that a tool cannot be inserted therein. Thus, disassembly of the valve and readjustment by rotating both plug 48 and screw 80 are also prevented.

After the valve has closed in response to an overpressure condition, it can be manually reset to the open position. For this purpose, the plunger assembly 62 includes a reset member 86. Member 86 includes an internally threaded portion 88 cooperating with the stud portion 66 to attach the plunger assembly 62 to the diaphragm 24 and to seal the central diaphragm opening 68.

The reset member 86 also includes a manually depressible button portion 90 extending toward the exterior of the housing 12 through an opening 92 in a boss 94 of the cover 34. When the valve is in the closed position illustrated in FIG. 3, the outer end of the button portion 90 projects above the boss 94 and can be manually depressed in order to move the plunger assembly 62 and the diaphragm 24 to the valve open position illustrated in FIG. 2.

In order to prevent fouling of the valve mechanism, a cap 96 is threaded onto the boss 94. A flexible strap 98 has one end staked to the cap 96 so that the cap can rotate relative to the strap. The other end of strap 98 is held to the cover 34 by one fastener 54 and the cap cannot be misplaced when it is removed.

The vent chamber 58 is communicated to atmosphere so that the operation of the valve 10 is determined by the difference between fluid pressure in chamber 20 and atmospheric pressure. More specifically, the button portion 90 is received with substantial clearance in the opening 92 so that the chamber 58 communicates freely with the region within cap 96. A number of grooves 100 are provided at the top of boss 94 communicating with the threads formed on the boss 94 and within the cap 96. One or both sets of threads are provided with flat crests and the region within the cap 96 is vented to atmosphere along the grooves 100 and along the thread clearance.

While the invention has been described with reference to details of the illustrated embodiment, such details are not intended to limit the scope of the invention as defined in the following claims.

What is claimed and desired to be secured by Letters Patent of the United States is:

1. An excess pressure shutoff valve comprising:
   a housing including inlet and outlet ports:
   a chamber in said housing in pressure communication with at least one of said inlet and outlet ports;
   a valve seat in said housing between said inlet and outlet ports;
   said chamber being defined in part by a diaphragm;
   a valve member movable relative to said valve seat between valve open and valve closed positions;
   a stem interconnecting said diaphragm and said valve member for simultaneous movement;
   said diaphragm consisting of a unitary, one-piece, fluid impervious bistable snap disc having two over-center stable positions corresponding respectively to said valve open and valve closed positions; and
   a spring urging said valve member toward the valve closed position.

2. The excess pressure shutoff valve of claim 1, further comprising an adjustable element holding said spring in compression.

3. An excess pressure shutoff valve comprising:
   a housing including inlet and outlet ports:
   a chamber in said housing in pressure communication with at least one of said inlet and outlet ports;
   a valve seat in said housing between said inlet and outlet ports;
   said chamber being defined in part by a diaphragm;
   a valve member movable relative to said valve seat between valve open and valve closed positions; and
   a stem interconnecting said diaphragm and said valve member for simultaneous movement;
   said diaphragm consisting of a unitary, one-piece, fluid impervious bistable snap disc having two over-center stable positions corresponding respectively to said valve open and valve closed positions;
   said stem including a reset portion extending from said housing in the valve closed direction.

4. The excess pressure shutoff valve of claim 3, said housing including a body and a cap fixed to said body for capturing said diaphragm between said cap and said body, said cap being vented to vent the side of said diaphragm opposite said chamber; and said reset portion extending through said cap.

5. An excess pressure shutoff valve comprising:
   a housing including an inlet, an outlet, a pressure chamber and a valve seat defining a fluid flow path through said housing;
   a bistable, overcenter, snap-acting diaphragm supported by said housing;
   a valve member cooperating with said valve seat to open and close said flow path;
   a stem interconnecting said diaphragm and said valve member for holding said valve member in the open position when said diaphragm is in a first stable position and for holding said valve member in the closed position when said diaphragm is in the second stable position;
   said pressure chamber being defined in part by said diaphragm for biasing said diaphragm toward said second stable position in response to fluid pressure in said pressure chamber;
   diaphragm biasing means including a spring biasing said diaphragm toward said second stable position; and
   manually operable means connected to said diaphragm for resetting said diaphragm from said second to said first stable position.

6. The excess pressure shutoff valve of claim 5 further comprising an adjustable element for controlling the biasing force of said spring.

7. The excess pressure shutoff valve of claim 6, said element comprising a threaded element countersunk in said body, and means covering said element for preventing adjustment of said element.

8. The excess pressure shutoff valve of claim 5, said diaphragm consisting of a unitary, one-piece metal snap disc.

9. An excess pressure shutoff valve comprising in combination:
   a housing including a body and a cover defining a cavity between said body and cover;
   a snap-acting diaphragm peripherally clamped in said cavity between said body and cover and having first and second overcenter stable positions;
   said diaphragm lying generally in a plane and cooperating with said body to define a pressure chamber in said cavity on one side of said diaphragm and cooperating with said cover to define a vent chamber on the opposite side of said diaphragm;
   a partition in said body and a valve seat in said partition communicating with said pressure chamber;
   said valve seat lying in a plane parallel with the plane of said diaphragm;
   a first port in said body communicating with said pressure chamber and a second port in said body communicating with said valve seat; and
   an elongated plunger assembly movable axially in said housing in a direction normal to said planes of said diaphragm and said valve seat and movable along a line intersecting said diaphragm and said valve seat;
   said plunger assembly being attached to said diaphragm for movement in response to movement of said diaphragm between said first and second stable positions;
   said plunger assembly including a valve member spaced from said valve seat in said first diaphragm position and engaged with said valve seat in said second diaphragm position.

10. The excess pressure shutoff valve of claim 9, said diaphragm consisting of a unitary, one-piece, fluid impervious sheet of substantially homogenous material formed into a snap disc.

11. The excess pressure shutoff valve of claim 9 further comprising a spring in compression between said housing and said plunger assembly biasing said valve member toward said valve seat.

12. The excess pressure shutoff valve of claim 11, said housing including an adjustable element mounted in said body for movement toward and away from said valve member, and said spring being captured in compression between said element and said valve member.

13. The excess pressure shutoff valve of claim 12, an opening in said body for insertion of said valve member during assembly, a plug closing said opening, and a recess in said plug for receiving a tool for installing and removing said plug.

14. The excess pressure shutoff valve of claim 13, said adjustable element being countersunk in said recess, and means for preventing access to said recess.

15. The excess pressure shutoff valve of claim 14, said last mentioned means comprising a potting compound filling said recess.

16. The excess pressure shutoff valve of claim 9, said cover including an opening in line with said shutoff member, and said plunger assembly including a manually depressible reset portion extending into said opening for manual reset of said diaphragm from said second to said first stable positions.

17. The excess pressure shutoff valve of claim 16, said reset portion having clearance in said cover opening for venting of said vent chamber through said cover opening.

18. The excess pressure shutoff valve of claim 17, further comprising a cap releasably attached to said cover and overlying said cover opening, and means providing a vent passage from the interior to the exterior of said cap.

19. The excess pressure shutoff valve of claim 18, further comprising threads on said cap and cover for releasably attaching said cap to said cover, said threads being formed with clearance to define said vent passage.

20. A fluid pressure control valve comprising in combination:
a housing including a body and a cover defining a cavity between said body and cover;
a snap acting diaphragm peripherally clamped in said cavity between said body and cover and having first and second over center stable positions;
said diaphragm lying generally in a plane and cooperating with said body to define a pressure chamber in said cavity on one side of said diaphragm and cooperating with said cover to define a vent chamber on the opposite side of said diaphragm;
said diaphragm consisting of a unitary, one-piece, fluid impervious sheet of substantially homogeneous material formed into a snap disc;
a partition in said body and a valve seat in said partition communicating with said pressure chamber;
said valve seat lying in a plane parallel with the plane of said diaphragm;
a first port in said body communicating with said pressure chamber and a second port in said body communicating with said valve seat;
an elongated plunger assembly movable axially in said housing in a direction normal to said planes of said diaphragm and said valve seat and movable along a line intersecting said diaphragm and valve seat;
said plunger assembly including a first portion interconnected with said diaphragm for movement in response to movement of said diaphragm between said first and second stable positions;
said plunger assembly including a second portion comprising a valve member cooperating with said valve seat to open and close said valve seat; and
said first portion of said plunger assembly including a manually movable reset portion for manual reset of said diaphragm from said second to said first stable positions.

* * * * *